Patented Oct. 12, 1954

2,691,619

UNITED STATES PATENT OFFICE 2,691,619

FAT-SOLUBLE VITAMIN-CONTAINING PRODUCTS AND PROCESS THEREFOR

Abraham Bavley, Brooklyn, Wilbur A. Lazier, Kew Gardens, and Albert E. Timreck, New York, N. Y., assignors to Chas. Pfizer & Co., Inc., New York, N. Y., a corporation of Delaware No Drawing. Application September 18, 1951, Serial No. 247,198

3 Claims. (Cl. 167—81)

The present invention relates to the production of vitamin-containing materials, and more particularly to certain improved therapeutic preparations comprising small particles of gelled, colloidal material having dispersed and imprisoned therein one or more of the fat-soluble vitamins.

Compositions have been described previously in which vitamin-bearing oils are incorporated in fine particles or beadlets of gelatin or similar gelable natural colloids. Such products are described, for instance, in U. S. Patents Nos. 2,183,053, 2,183,084, 2,218,592. Another type of vitaminaceous beadlet, prepared by incorporating a crystalline vitamin A compound in a gelable colloid, is disclosed in the copending patent application of Edward J. Goett et al. filed on May 16, 1951 and given the Serial No. 226,736. A serious problem is encountered in the commercial preparation of any one of these dosage forms. During cooling of the oily medium in which the beadlets are formed, coalescence or aggregation of the small particles frequently occurs. The mass seems to pass through a sticky stage while gelling, in which stage the coalescence is particularly noticeable. It is thus difficult or impossible to recover small and uniformly sized beadlets. Since many uses for these beadlets require particles of a definite, controlled size range, this tendency is most undesirable. A good illustration is in the preparation of vitamin A tablets, where the vitamin is introduced as gelatin beadlets containing either a vitaminaceous oil or crystalline vitamin A itself. It is important that the beadlets be of uniform size, so that the mechanical properties of the tablets will be most favorable.

It has now been found that such uniformity and control of particle size, as well as enhanced stability of the resulting dosage forms, may be realized by commingling a water-soluble, synthetic resinous material with the gelatin or other gelable colloid used. Notably satisfactory synthetic resins are the vinyl resins like polyvinylpyrrolidone or polyvinyl alcohol. These compounds must obviously also be non-toxic, so that large amounts may be ingested by humans or animals without any untoward effects.

In preparation of the vitaminaceous particles or beadlets, procedures like those outlined in the aforesaid patent application of Goett et al. may be followed. If a crystalline vitamin is used, during the process the composition may be heated to a temperature above the melting point of the crystals, in order that the active substance may be finely dispersed throughout the matrix of the beadlet. Upon cooling, the vitamin becomes imbedded in finely divided form in the granules. Of course, if desired, the new process may be utilized to mold larger particles, which also then display excellent stability and mechanical properties. However, in the preparation of such molded forms, the outstanding advantage of accurate particle size control is not so important as in the preparation of the beadlets.

The improved particles of this invention generally are made by first commingling an aqueous solution of the gelable colloid material, e. g. gelatin, the water-soluble, synthetic resin as aforesaid, and a plasticizer. This last preferably contains glucose or invert sugar like corn syrup, glycerine, propyleneglycol, sorbitol, mannitol, molasses or honey. It seems to aid in preventing case hardening and brittleness of the finished product. Too, it renders the matrix more impervious to penetration of air, with attendant loss in potency of the oxidizable vitamins. The commingled mass is then heated and the vitamin or vitamin-containing oil is incorporated with suitable agitation. As previously indicated, the resulting dispersion may be heated above the melting point of the vitamin constituent, if the latter is used in crystalline form. Best results are achieved if the crystalline vitamin has a melting point somewhat below the boiling point of water. After the vitamin material has been well dispersed throughout the aqueous solution, an oil or a suitable organic liquid is mixed therewith, while agitating the mass so that the suspension of vitamin in the gelable solution is formed into fine droplets. Upon cooling this, the gelable material sets, imprisoning the vitaminaceous component in the droplets. Various organic solvents, preferably those having some water solubility, may be added to the oil medium in which the beadlets are formed. They serve not only to assist in the gelling, but also to extract some of the water which may be present. Examples of useful solvents are isopropanol, butanol, methyl isobutyl ketone, acetone and so forth.

In the operation of this improved process, and particularly while the materials are at an elevated temperature, the stability of the beadlets may be improved by excluding air. This may be done by blanketing the surface of the aqueous dispersion with an inert gas. Boiled, air-free water may also be used in preparing the initial aqueous solution of gelatin, resin and sugar-like plasticizer. Once the beadlets have been formed and hardened, these precautions are much less important, of course.

After the beadlets have gelled by cooling, they may be removed from the suspending oil or solvent by filtration or other suitable means. Residual dispersing medium may be rinsed from their surface with suitable solvent and they are then dried, under atmospheric conditions. Part of the drying may be accomplished by again using organic solvents, which not only wash oil from the surface of the particles and harden them, but also may extract more moisture. Solvents such as acetone, ethanol, dioxane or isopropanol are quite suitable for this purpose.

The beadlets thus prepared embodying synthetic, water-soluble resinous material constitute greatly improved products and retain their discrete character and shape extremely well. They do not have any appreciable tendency to adhere to one another or to coalesce into larger lumps, even while the critical gelling takes place.

It has been found that certain proportions of the various ingredients for these improved compositions are most suitable. Thus, the water-soluble resin is preferably present in an amount up to about 40% of the weight of the gelable material. The remainder of the matrix solution may be gelatin or other gelable colloid material, such as pectin, gum tragacanth, etc. However (as previously noted), a sugar-like plasticizer in minor quantity is best added, also. At least about 5% by weight of the water-soluble resin should generally be employed in these beadlets. One skilled in the art of preparing pharmaceuticals can readily determine the most effective range of proportions for any given array of constituents. The proportion by weight of water to total gelable materials (e. g. gelatin plus the resin, e. g. polyvinyl alcohol or polyvinylpyrrolidone) should be between about 1.5 to 1 and about 2.5 to 1. It is, of course, better to maintain the proportion of water as low as is feasible, in keeping with good operating conditions, in order that the time necessary for drying the particles may be reduced to a minimum.

It is to be understood that the various materials referred to above may readily be replaced by comparable materials. Thus, although vitamin A has been specifically mentioned several times, it is obvious that this invention is valuable in the preparation of similar dosage types of the other fat-soluble vitamins, such as vitamin D in its various forms, vitamin E in its various forms, etc. These compounds may be utilized as crude oils or as highly purified materials. Mixtures of the oil-soluble vitamins are useful, too. Generally speaking, the cruder the vitamin material in the compositions of this invention, the lower the potency and stability of the finished product. When crystalline vitamin A is used, for instance, potencies of as high as 700,000 units of the vitamin per gram of dried beadlets or more may be attained. Furthermore, the inert oil use as a suspending medium in the formation of the beadlets may be varied considerably. It may be mineral oil, corn oil, soybean oil, cotton oil, sesame oil, or other such material. It should best have a sufficiently high viscosity or the beadlets may not form properly when the aqueous, gelable dispersion is stirred into it.

The following examples are given by way of illustration and are not to be considered as the sole embodiments of this invention. It is to be understood that protection hereof is only to be limited by the specific wording of the appended claims.

*Example I*

A mixture of 64 grams of commercial corn syrup and 120 ml. of water was heated to 65° C. To the solution were added 54 grams of pharmaceutical-grade gelatin. The mixture was stirred at 65° C. for a short time and 16 grams of polyvinylpyrrolidone (commercially available material with a viscosity index of K-40) were added. When this material had dissolved completed, 11.1 grams of crystalline vitamin A acetate were added to the mixture. After stirring for three minutes, 240 ml. of mineral oil were added and stirring at 65° C. was continued for a few more minutes. The mixture was then cooled over a period of 20 to 30 minutes to a temperature of 10° C. and was stirred rapidly for five minutes longer, during which time small globules of the aqueous phase containing suspended vitamin A acetate were formed. Four hundred milliliters of isopropanol, pre-cooled to 10° C., were added to the suspension. When the beadlets had been gelled and the oil cooled, there was substantially little tendency for aggregation. The particles were well defined globules which did not stick to one another even when stirring was reduced to a minimum. The product was filtered, drained free of oil and washed by suspension in 400 milliliters of cold isopropanol. After refiltering, the gelled beadlets were dried in a low humidity area at room temperature for approximately 20 minutes and finally washed with two 300 milliliter portions of hexane to remove the last traces of oil remaining on their surfaces.

*Example II*

A mixture of 64 grams of commercial corn syrup and 120 ml. of water was stirred together and 56 grams of pharmaceutical-grade gelatin was added. The mixture was heated to 65° C. and, when the gelatin had dissolved, 24 grams of polyvinyl alcohol were added. When the polymer had dissolved completely at 65° C., 11.1 grams of crystalline vitamin A acetate were added. The mixture was stirred until the vitamin A compound had melted and dispersed uniformly throughout the mixture, and 240 ml. of mineral oil were then gradually added. The mass was stirred rapidly for a few minutes, whereupon the aqueous phase became dispersed throughout the mineral oil phase in the form of tiny globules, quite uniform in size. The emulsion was then cooled over a period of about 30 minutes to 10° C., maintaining agitation throughout the cooling period. To the suspension were added 400 ml. of isopropanol which had also been cooled to 10° C. After stirring for a further five minutes, the gelled beadlets were filtered on a Buchner funnel and were washed with 400 ml. of cold isopropanol. Once the gelled globules had been formed, essentially no agglomeration or aggregation thereof occurred, even though the speed of stirring was reduced greatly. The beadlets were dried by exposure to low humidity air at about room temperature, washed twice with hexane and redried.

The product proved to be a particularly suitable, stable dosage form of vitamin A, useful in itself or valuable as a component of various other pharmaceutical preparations.

*Example III*

A mixture of 64 grams of commercial corn syrup plasticizing agent and 120 ml. of water was stirred at 65° C. for a short time and 72 grams of pharmaceutical-grade gelatin added thereto. Upon dissolution of the latter, 8 grams of polyvinylpyrrolidone resin were stirred therein at 65°

C. for a few minutes until completely dissolved. To this mixture were added 11.1 grams of crystalline vitamin A and stirring was continued at 65° C. while the vitamin A acetate was melted and dispersed uniformly throughout the aqueous phase. Mineral oil (240 ml.) was cooled to 10° C. and, while this material was rapidly stirred, the hot aqueous suspension of vitamin A acetate was poured through a funnel in a fine stream into the vortex of the cold oil. Upon entering the oil, the aqueous phase gelled to form fine globules of vitamin A suspension. A cooling bath surrounded the mineral oil so that its temperature was maintained at about 10° C. throughout the addition. Four hundred ml. of cold isopropanol were then added to the suspension and after a further short period of stirring, the product was filtered, washed with 400 ml. of cold isopropanol and dried in a low humidity atmosphere at room temperature for 24 hours. The dry beadlets, comprising discrete globular particles highly potent in vitamin A, were then washed twice with 300-milliliter portions of hexane to remove traces of mineral oil adhering to the surface.

When the same process was repeated using vitamin D in lieu of vitamin A, similar therapeutically potent discrete beadlets were obtained.

What is claimed is:

1. A process for preparing vitamin A beadlets which comprises dissolving in water gelatin, corn syrup and up to about 40% by weight of polyvinylpyrrolidone, adding a crystalline vitamin A compound to the solution with agitation while heating the dispersion to a temperature above the melting point of the vitamin, introducing mineral oil and stirring to form beadlets of uniform size, adding a water-miscible organic solvent and chilling the suspension of beadlets, removing the beadlets from the oil-solvent phase and drying the beadlets.

2. A vitaminaceous beadlet which comprises a fat-soluble vitamin dispersed throughout a matrix of gelatin containing a water-soluble synthetic vinyl resin selected from the group consisting of polyvinyl alcohol and polyvinylpyrrolidone.

3. A process for preparing vitaminaceous beadlets which comprises dissolving in water gelatin, a plasticizing agent selected from the group consisting of sugars, glycerine and propylene glycol, and a resin selected from the group consisting of polyvinyl alcohol and polyvinylpyrrolidone, mixing a fat-soluble vitamin with the solution, heating the mixture, introducing an inert oil suspending medium and stirring to form beadlets of uniform size, adding a water-miscible organic solvent and chilling the suspension of beadlets, removing the beadlets from the oil-solvent phase and drying the beadlets.

References Cited in the file of this patent

UNITED STATES PATENTS

| Number | Name | Date |
|---|---|---|
| 2,072,302 | Herrmann | Mar. 2, 1937 |
| 2,183,053 | Taylor | Dec. 12, 1939 |
| 2,183,084 | Reynolds | Dec. 12, 1939 |
| 2,218,592 | Taylor | Oct. 22, 1940 |
| 2,299,929 | Raynolds | Oct. 27, 1942 |
| 2,467,583 | Cosar | Apr. 19, 1949 |
| 2,474,729 | Durel | June 28, 1949 |

FOREIGN PATENTS

| Number | Country | Date |
|---|---|---|
| 454,386 | Germany | Jan. 6, 1928 |